Aug. 28, 1951  C. D. ADAMS  2,565,835
METHOD AND APPARATUS FOR CONVEYING
PULVERULENT MATERIAL
Filed Nov. 13, 1945  6 Sheets-Sheet 5

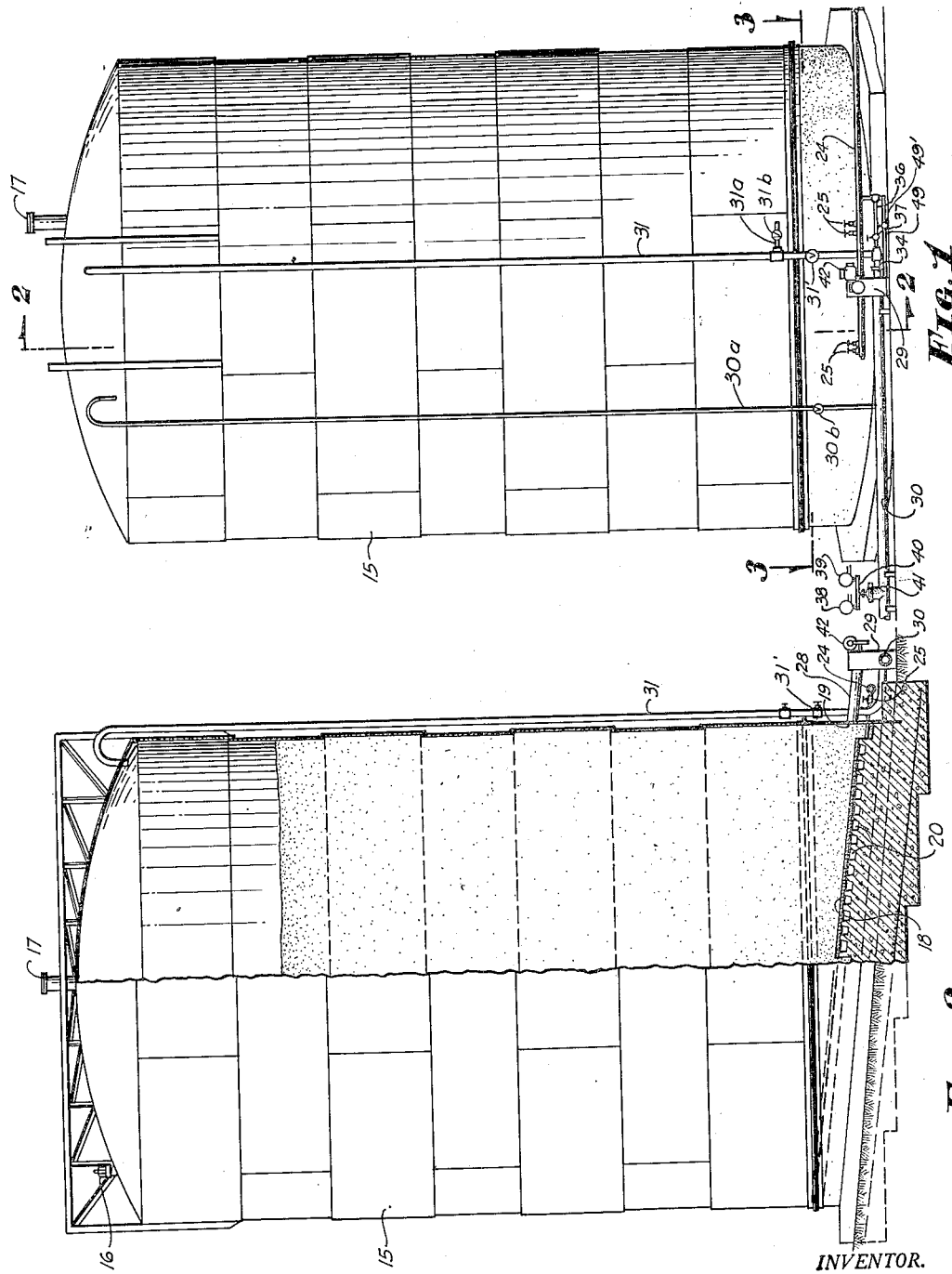

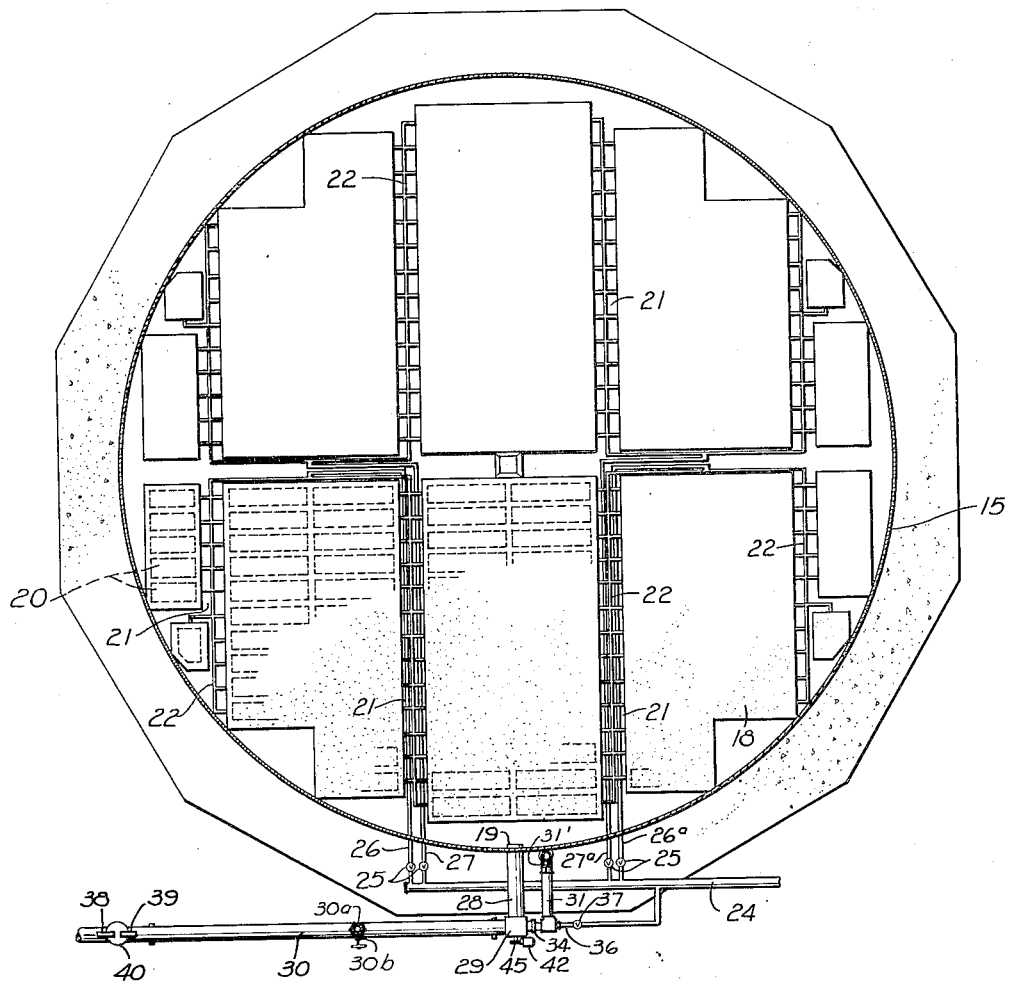

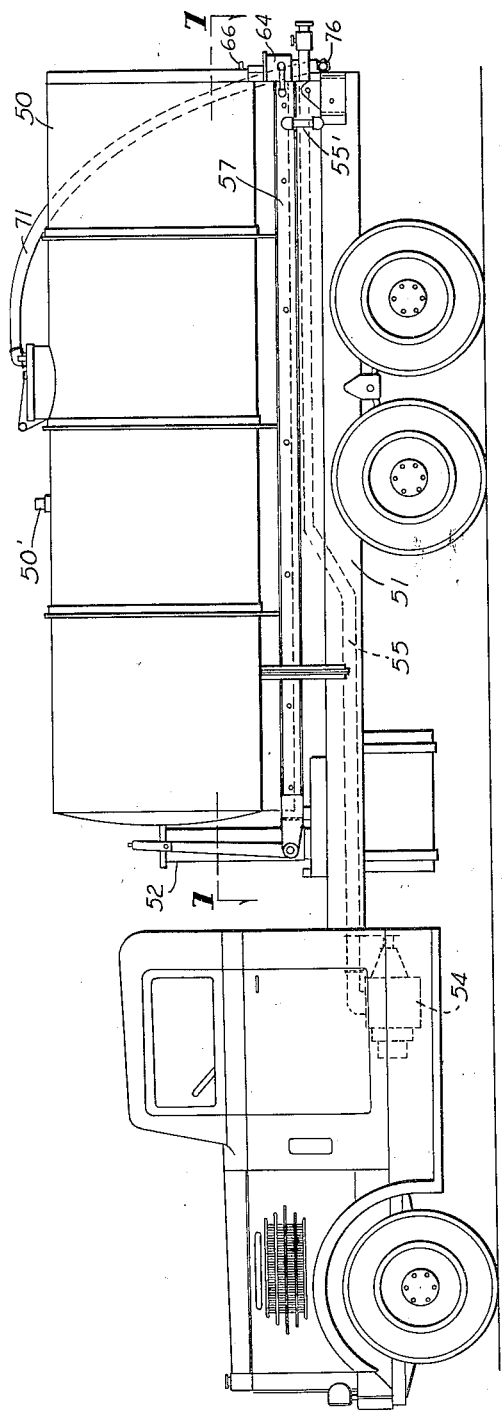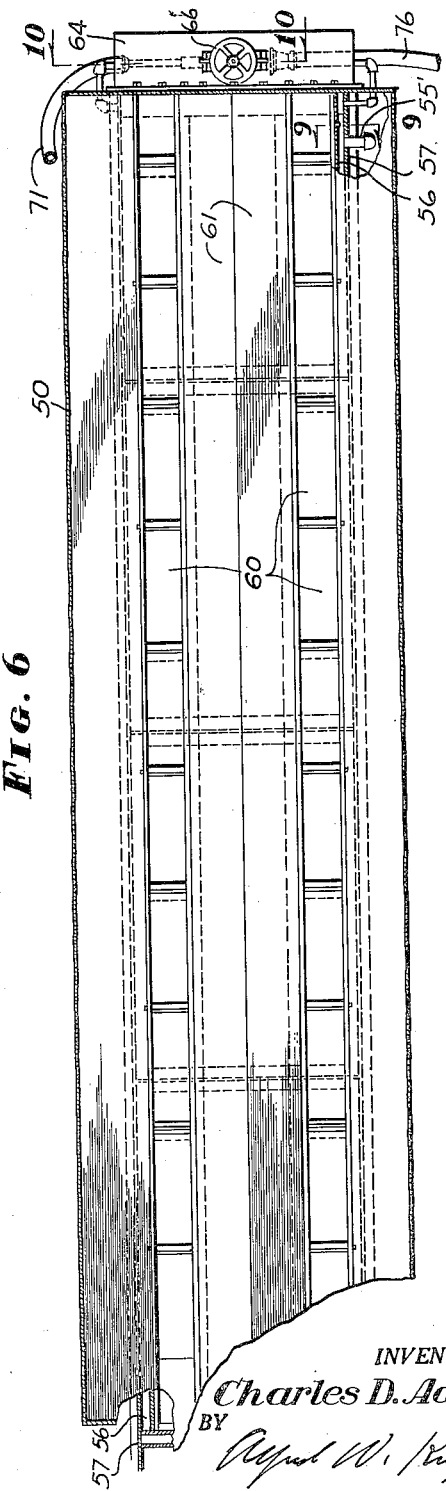

INVENTOR.
Charles D. Adams
BY
ATTORNEY

INVENTOR.
Charles D. Adams
BY
ATTORNEY

Patented Aug. 28, 1951

2,565,835

UNITED STATES PATENT OFFICE 2,565,835

METHOD AND APPARATUS FOR CONVEYING PULVERULENT MATERIAL

Charles D. Adams, Pomona, Calif., assignor to Riverside Cement Company, Los Angeles, Calif., a corporation of Delaware Application November 13, 1945, Serial No. 627,995

4 Claims. (Cl. 302—53)

My invention relates generally to the discharging and conveying of pulverulent materials and to apparatus therefor and more particularly to a method and means for discharging and conveying such materials pneumatically while in fluid condition produced by aeration.

Pneumatic conveyance of finely powdered materials has, of course, long been practiced, and in some systems air has also been introduced into the bulk of the material prior to so conveying it as a means of fluidifying it and making it more amenable to movement. Systems of this type hitherto in use have not, however, utilized the air so employed to the best advantage and economy, with the result that they have required large volumes of air under high pressures, with the consequent evils of poor control, heavy dusting, and excessive power consumption.

It is a principal object of my invention to provide a method and apparatus for discharging finely comminuted, powdery materials, such as cement, from one bulk container, and for conveying it to another such container or point of use, storage or packaging, in which method and apparatus the same air or other gas may be used for both of the stated operations.

It is a further object of my invention so to utilize and direct the gas stream of these operations and the stream of fluidified pulverulent material, that they may be combined for the purposes of conveying the material at relatively high velocity and relatively low pressure, the velocity induced by one stream in the other supplanting the high pressure otherwise required.

Another object of my invention is to provide means for controlling the rate of transfer of the pulverulent materials from their primary container which shall act directly upon those materials rather than upon the gas stream, thus permitting the gas stream to be controlled independently, if circumstances so require.

Still another object is to provide automatic regulating means for the aforesaid controlling means which are responsive to conditions in turn indicating the correct mixture of gas and of the materials conveyed thereby, so that the conveying system is neither clogged by a surplus of material nor utilized below its maximum efficiency.

Although air is ordinarily the most convenient and economical gaseous medium to employ for fluidifying and conveying the material, and will be referred to specifically in the following description, it may in some cases be desirable to use some other gaseous medium, such as combustion gases, and it will be understood that any gas may be equivalently employed.

In the application of my method of discharging and conveying pulverulent materials, it is to be understood that the end point of such movement forms no part of the invention and may be varied to suit circumstances and is therefore not shown or described herein, and that the initial container from which the materials are discharged and conveyed may be any container suitably equipped with fluidifying and discharge devices, of which typical forms are herein illustrated, such as a stationary silo or such a vehicle as is described in my copending application Serial No. 619,214 filed September 28, 1945, now abandoned. Apparatus embodying my invention and capable of carrying my method into effect for the attainment of the above and other useful objects may be readily applied to such containers in a manner which will be understood from the following description of typical applications of such apparatus, and from the accompanying drawings, in which:

Fig. 1 is an elevational view of a silo provided with discharging apparatus in accordance with my invention;

Fig. 2 is a view half in vertical section and half in elevation taken on the line 2—2 of Fig. 1 and showing the aerifying and fluidifying apparatus within the silo;

Fig. 3 is an enlarged horizontal section on the line 3—3 of Fig. 1 illustrating the method of distributing the fluidifying air throughout the base of the silo;

Fig. 6 is a side elevation of another embodiment of my invention, showing the application of the invention to a truck;

Fig. 7 is an enlarged horizontal section on the line 7—7 of Fig. 6;

Figure 4:
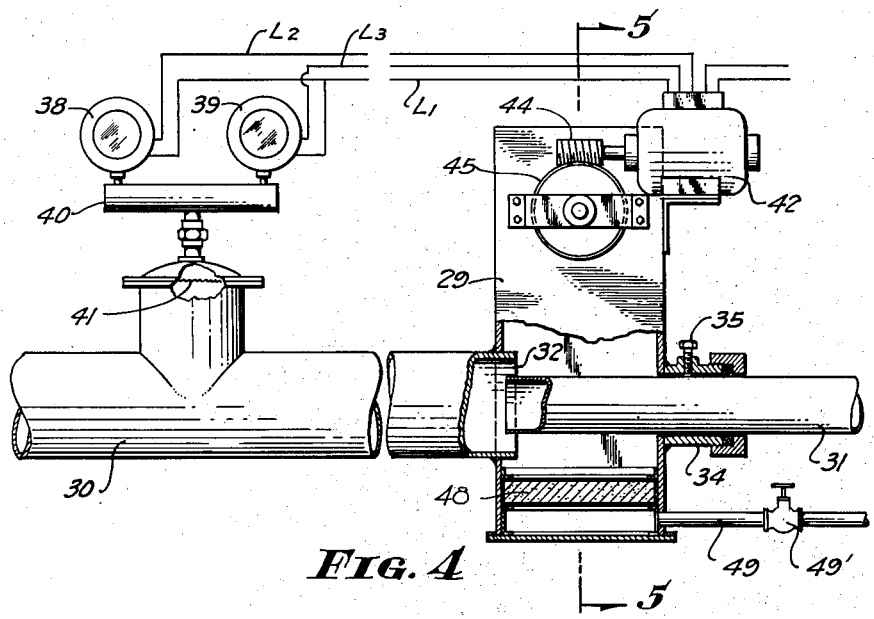
Fig. 4 is a further enlarged view, partly schematic, of the discharge mechanism and the pressure-responsive controls therefor.
Figure 5:
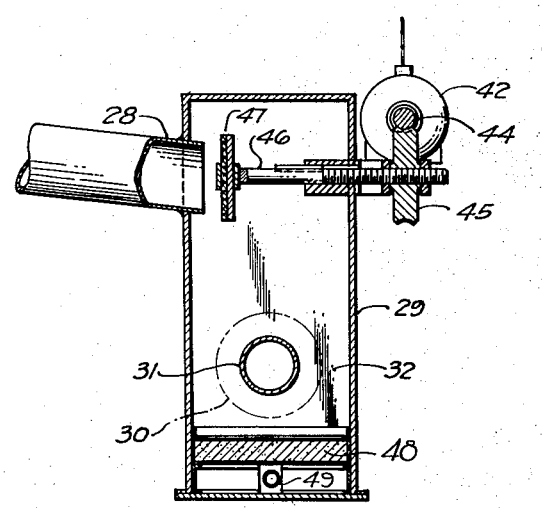
Fig. 5 is a vertical section on the line 5—5 of Fig. 4 showing details of the discharge valve.

Referring now to the drawings in detail, and more specifically to Figs. 1 to 5, the numeral 15 indicates a tank of the type generally referred to as a silo, for storage of materials, and in the present instance for the storage of pulverulent materials such as cement or powdered coal. The silo 15 is of air-tight construction, having at its upper end a safety-valve 16, for the release of excess pressure, and a closable inlet 17, whereby it may be filled. The floor 18 of the silo is sloped towards one side to provide for gravity flow of the fluidified material to a discharge opening 19.

The floor 18 is composed of porous cement or like foraminous material permeable by an air current, and rests upon partitions which divide the under-floor space into a multiplicity of air chambers 20 and pipe ducts 21. A piping system 22 is laid in the ducts 21 to connect an outside supply pipe 24, leading from a source of compressed air or other gas, not shown, to the air chambers 20, the system 22 being preferably divided into a number of units each controlled by its individual valve 25 and each feeding air to a specific area of the floor 18, so that more or less air may be fed to each of these areas should the need arise. It will be seen from Fig. 3, by way of example, that the two outer pipes 26 and 26a lead to the forward or lower quarters of the floor 18 and that the two inner pipes 27 and 27a lead to the rearward or higher quarters of the floor, the two latter areas being naturally the first to be uncovered as the pulverulent material drains from the silo, so that it may then be advantageous to confine the air-flow to the areas still covered.

A discharge pipe 28 connects the discharge opening 19 with the upper portion of an ejector chamber 29, from the lower portion of which a conduit 30 extends to a point of use, or packaging, or other container, not shown. A pipe 31 leads from the upper interior portion of the silo 15 to the ejector chamber 29, which it enters and extends across to a position within or adjacent the open receiving end of the conduit 30 with an annular clearance indicated at 32. For adjustment of the position of pipe 31 relative to the receiving end of conduit 30, a packed slip collar 34 is provided on the ejector chamber 29, and the pipe 31 is held adjustably within this collar by a set-screw 35. A by-pass line 36, with valve 37, may if desired connect the supply pipe 24 with the pipe 31 to provide a direct supply of air when so required. It will be seen that the pipe 31 and the conduit 30 are arranged to form an ejector operating on the material in chamber 29 and the discharge pipe 28. The air supplied to the pipe 31, either from the top of the silo 15 or from the by-pass line 36, is released into the larger conduit 30, and entrains the contents of the chamber 29, either air or fluidified material through the annular space 32, creating a low pressure zone in the chamber and thus enhancing the pressure differential at the ends of the discharge pipe 28. Chamber 29 is shown as provided at its lower end with a porous wall member 48 through which air may be supplied by pipe 49 having a valve 49', for maintaining in thoroughly aerated and fluidified condition any material accumulating in said chamber, thus facilitating entrainment of such material into the conduit 30.

A pair of mercoid pressure switches 38 and 39 register the pressure within the conduit 30, being connected thereto by pipe connections 40 in which a diaphragm filter cloth 41 protects the switches from dust. The switches are connected to a reversible motor 42 which acts through a worm drive 44 and 45 upon a valve stem 46, keyed in its mounting so as to be moved longitudinally therein rather than be rotated. The large gear 45 of the worm gear is threaded internally to mesh with the threads of the valve stem 46. The stem 46 is aligned with the end of the discharge pipe 28 and carries a valve disc 47 for closing the end of the pipe when moved into contact therewith. The mercoid switches may be set to operate the motor to maintain a pressure within a desired range in the conduit 30, one of them, for example switch 38, being set to close the circuit through wires $L_1$ and $L_2$ and turn the motor in the direction required to move the valve disc 47 toward closed position with respect to the end of the discharge pipe 28 whenever the pressure in the conduit 30 exceeds the pressure at which it is set, and the other switch, 39, being set to close the circuit through wires $L_1$ and $L_3$ and turn the motor in the reverse direction to cause opening movement of the valve when the pressure falls below a certain pressure.

Although I have shown electrical regulating means for controlling the operation of the control valve 47 in response to variations in the pressure in conduit 30, it will of course be understood that other types of regulating means may be employed for this purpose.

In discharging and conveying the contents of a silo provided with the above described apparatus, the operation will generally be started with the valve 37 and the control valve 47 closed. Valves 25 in air supply lines 26, 26a, 27 and 27a and valve 49' in line 49 are opened, and compressed air at suitable pressure is admitted to the piping system 22 and the air chambers 20, whence it passes through the porous floor 18 and upwardly through the contents of the silo, fluidifying the pulverulent material. When the air reaches the upper portion of the silo, it passes by the pipe 31 to the ejector formed by that pipe and the conduit 30 in the ejection chamber 29, creating a low pressure zone therein. Motor 42 is energized to move control valve 47 toward open position, the "low pressure" switch 39 being closed due to the fact that only air is then flowing through conduit 30. The fluidified material in the silo will then flow through the discharge pipe 28 into chamber 29, and will be drawn therefrom into conduit 30 by ejector action. It will be seen that, for inducing such movement, the reduced pressure of the ejector, the weight of the material, and the pressure in the silo, are all cooperative and complementary. The stream of material pouring through the discharge pipe 28 largely by gravity is drawn by the reduced pressure of the ejector into the conduit 30 and is carried by the air stream to its terminus. In case it should be found desirable, additional air for conveying may be supplied to pipe 31 through pipe 36 by opening valve 37.

During the course of the operation, the automatic regulating means acts to control the closing and opening of the valve at the end of the discharge pipe 28 in response to pressure variations in the conduit 30. If an excess of material is in the line in proportion to the carrier air, the pressure therein will rise, closing the "high pressure" switch 38, and the valve will move towards its closed position, cutting down the supply of material. Conversely, if the air-material mixture is too lean, the pressure in the conduit will drop, closing the "low pressure" switch 39, and the valve will open to admit more of the material to the ejector chamber.

In order to adapt the apparatus for other methods of operation than described above, I have shown a valve 31' in pipe 31 for variably controlling the flow therethrough and thus controlling the pressure in the tank, or for completely shutting off flow of air therethrough if desired, and have also shown a branch pipe 31a leading from pipe 31 to the atmosphere at a point between the top of the tank and valve 31' and provided with a valve 31b. A pressure-equalizing pipe 30a provided with valve 30b is also shown connecting the top of tank 15 to the conveying conduit 30.

When carrying out the preferred method described above, valve 31' is open, and valves 30b and 31b are closed. However, I may if desired close valve 31' and open valve 37, relying entirely upon the introduction of air through pipe 36 to pipe 31 and thence to the ejector device and conveying conduit 30. When operating in this manner, valves 30b and 31b may be left closed, and the air introduced into the tank 15 and not discharged therefrom with the fluidified material may be discharged through relief valve 16 which may be set to open at any desired pressure; or valve 30b may be opened so as to balance the pressure in the top of the tank 15 and in conveyor conduit 30; or valve 30b may be left closed and valve 31b opened so as to permit the air from the top of the tank to be discharged freely to the atmosphere, relying entirely on the gravity head of the fluidized material to cause flow of such material to the ejector device where it is picked up by the conveying air stream.

Figure 8:
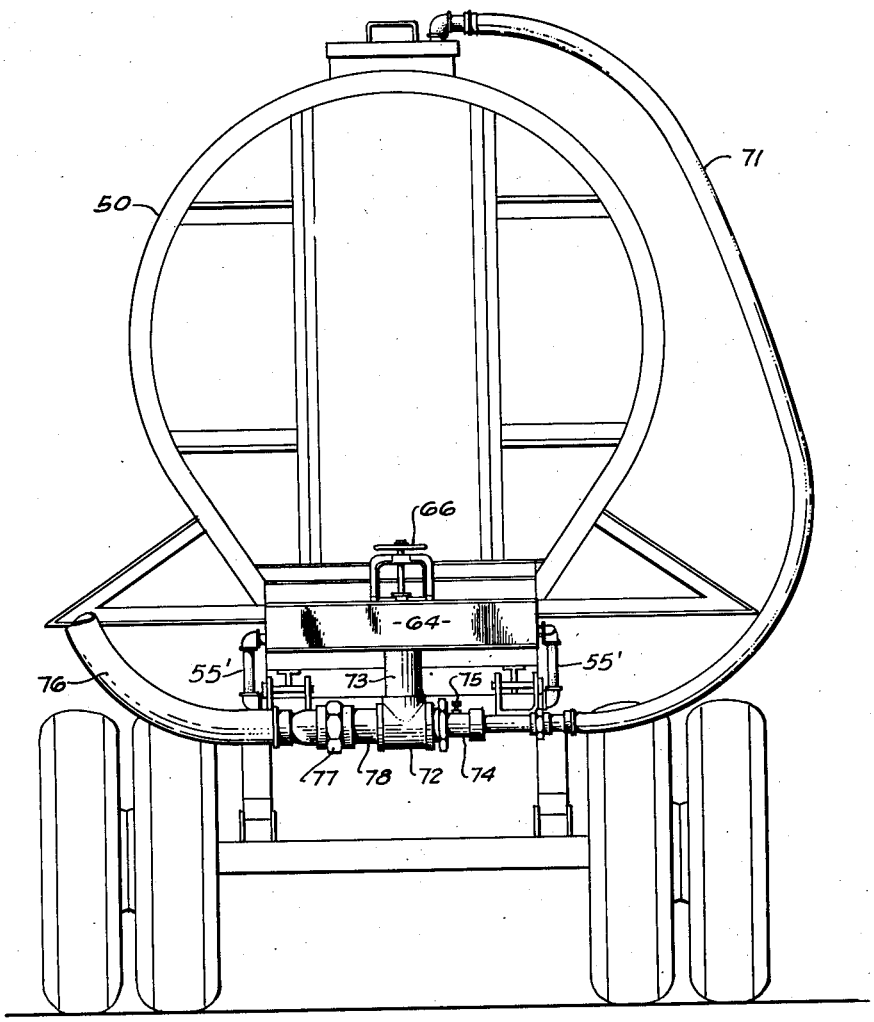
Fig. 8 is a further enlarged rear elevation of the truck shown in Figs. 6 and 7.
Figure 9:
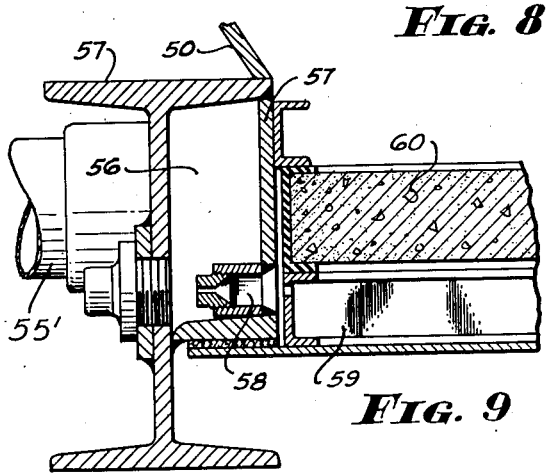
Fig. 9 is a further enlarged sectional detail on the line 9—9 of Fig. 7 showing the method of introducing the fluidifying air through the floor of the truck.
Figure 10:
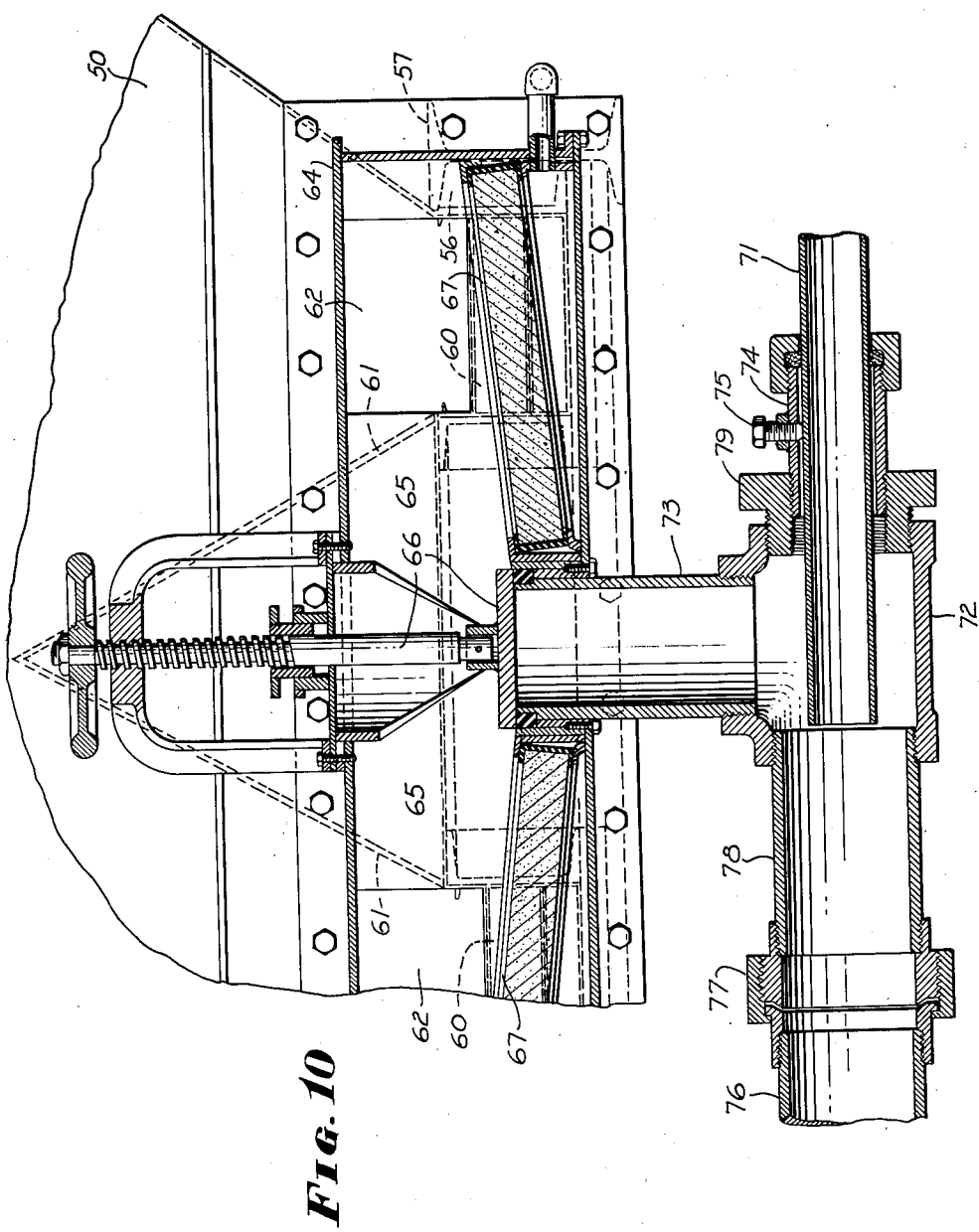
Fig. 10 is an enlarged sectional view on the line 10—10 of Fig. 7.

In Figs. 6 to 10 I have illustrated the application of the above described apparatus to a vehicle, such as a truck, with certain modifications due to the fact that a truck, subject to rough usage and movement, may not as readily be equipped with automatic controls as a stationary silo, although it is of course possible and it is my intention that either embodiment may be applied to either type of container. The truck herein illustrated is similar to that described in my copending application, Serial No. 619,214, and as the details of construction are fully described therein they will not be itemized here.

In general, a tank 50 provided with a relief valve 50' is mounted on a truck chassis 51 so as to be tiltable by a jack 52 and receives a supply of compressed air from a compressor 54 through a supply line 55. The air is piped from line 55 through suitable flexible connections to branch pipes 55' carried by the tiltable tank structure, whence it enters air ducts 56 formed by the longitudinal support frames 57 of the tank structure and thence passes by orifices 58 to air chambers 59 below porous blocks 60 which form the floors of parallel longitudinal hopper-shaped channels 61. As the air passes upwardly through the blocks 60, it fluidifies the contents of the tank, which are thereby induced to flow through outlet openings 62 at the rear of the channels 61 into a discharge casing 64. This casing has passages 65 leading to a manually operated valve 66 and floored with porous blocks 67 connected to the air supply system of the tank so that the fluidified materials maintain their fluid condition as they traverse the passages 65 and pass out through the valve.

In my application referred to the air admitted to the tank 50 through the porous blocks 60 either passed out with the fluidified material through the valve 66 or was vented through the relief valve in the top of the tank. In the embodiment of my present invention now described, an air line 71 such as a flexible pipe or hose connects the upper portion of the tank with an ejection chamber 72 which is connected to the outlet 73 of the valve 66. The pipe 71 enters the ejection chamber 72 through a packed slip collar 74 in which it is held by set-screw 75, and forms with the conveying conduit an ejector, as in the embodiment illustrated in connection with the silo 15. However, the conveying conduit is preferably removable from the vehicle, and is therefore shown as comprising a hose or other flexible conduit 76 connected to chamber 72 by means of a union 77 and nipple 78. The ejection chamber 72 may be readily formed by attaching a T-fitting to the outlet pipe 73 of the valve 66 and providing a reducer 79 to receive the slip collar 74. The pressure responsive regulating means may be omitted from this embodiment to avoid the necessity of making and breaking electrical connections between the switches and the motor each time the conveying conduit is connected or disconnected, and the flow of fluidified materials may be proportioned with respect to the volume of the carrier air stream by means of the manually operated valve 66.

Operation of this application of my invention to a truck is, in principle, the same as that of the application to a silo. When the conduit 76 has been attached to the ejection chamber 72, the compressor 54 is started and the air is forced through the porous blocks 60 and 67. The valve 66 is preferably left closed until a sufficient volume of air is passing through the tank and through line 71 to operate the ejector and to supply carrier air in the conduit 76. Valve 66 is then opened, and the system operates to fluidify and discharge the material from the tank and convey such material through conduit 76 in substantially the same manner as described above. Regulation of the flow of fluidified material is obtained by hand operation of the valve 66, the air supply being preferably constant as in the first described embodiment.

Utilizing the apparatus and method herein described, I have found that air at relatively low pressure may be used both for fluidifying the material in the tank for pneumatically conveying the fluidified material discharged from the tank to a position at a considerable height above the point of discharge from the tank. The pressure at which the air is supplied will of course depend upon the type of material handled, the height of the body of material in the tank, the rate at which the material is to be discharged and the size of the passages through which it is discharged and conveyed, and the height to which it is desired to lift the material above the point where it enters the conveying conduit. In general, I am able to operate with air at a pressure of about four to ten pounds per square inch for aerating and conveying the pulverulent material, with a lift of from about fifteen to one hundred feet.

Having now described and illustrated preferred and modified embodiments of my invention, and the application thereof, and of my method of discharging and conveying materials, both to stationary tanks and to vehicles, I do not wish to be limited to the specific details herein set forth, the scope of my invention being defined in the following claims.

I claim:

1. In a pneumatic discharging and conveying system, the combination comprising: a closed tank adapted to contain a body of pulverulent material and provided with a discharge opening adjacent the bottom thereof; means for introducing a multiplicity of small streams of gas under pressure into the lower portion of said tank beneath the body of material therein to aerate and fluidify said material and to maintain a superatmospheric pressure in the tank above said body of material; a conduit for pneumatically conveying pulverulent material; a pipe for conducting gas under pressure from the upper portion of said tank into said conduit to establish a conveying gas stream therein; means defining a passage for flow of fluidified material from said discharge opening to said conduit at a position to be picked up by said conveying gas stream; a valve for controlling the flow of material through said passage; and means responsive to variations in pressure in said conduit and operable to move said valve toward open position upon decrease in said pressure and to move said valve toward closed position upon increase in said pressure.

2. In a pneumatic discharging and conveying system, the combination comprising: a closed tank adapted to contain a body of pulverulent material and provided with a discharge opening adjacent the bottom thereof; means for introducing a multiplicity of small streams of gas under pressure into the lower portion of said tank beneath the body of material therein to aerate and fluidify said material and to maintain a superatmospheric pressure in the tank above said body of material; a conduit for pneumatically conveying pulverulent material; means defining a passage for flow of fluidified material from said discharge opening to the receiving end of said conduit; an ejector device at the receiving end of said conduit; a pipe for conducting gas under pressure from the upper portion of said tank to said ejector device to create a reduced pressure at the receiving end of said conduit and to provide a flow of gas through said conduit for conveying said material therethrough; a valve for controlling the flow of material through said passage; and means responsive to variations in pressure in said conduit and operable to move said valve toward open position upon decrease in said pressure and to move said valve toward closed position upon increase in said pressure.

3. In a pneumatic discharging and conveying system in which pulverulent material is fluidified in a closed tank by gas streams passed therethrough and discharged therefrom into a pneumatic conveying conduit; an ejector intermediate between said tank and the receiving end of said conduit, said ejector being operable by gas supplied thereto from the upper portion of said tank; a valve between said tank and said ejector for controlling the flow of material from said tank to said ejector; and means responsive to variations in pressure in said conduit and operable to move said valve toward open position upon decrease in said pressure and to move said valve toward closed position upon increase in said pressure.

4. A method of pneumatically discharging and conveying pulverulent material from a closed tank having a discharge outlet adjacent the bottom thereof which comprises continually and simultaneously: introducing gas under pressure into the lower portion of a body of pulverulent material within said tank at positions removed from said discharge outlet, and passing such gas under pressure upwardly through said body of material to fluidify said material and to create a pressure within said tank above said body of material; discharging material so fluidified from said tank through said discharge opening; conducting gas under pressure from the upper portion of said tank above the body of material, separately from the discharge of fluidified material through said discharge outlet, and passing a stream of such separately conducted gas at high velocity outside the tank and adjacent said discharge outlet in such manner as to create a reduced pressure at said discharge outlet by ejector action for promoting outflow of fluidified material from the tank through said discharge outlet into said gas stream; conveying such material away from said discharge outlet in suspension in said gas stream; and regulating the outflow of fluidified material through said discharge outlet into said gas stream automatically in response to variations in pressure in said gas stream, in such manner as to increase such outflow of material upon decrease in said last named pressure and to decrease such outflow of material upon increase in said last named pressure.

CHARLES D. ADAMS.

REFERENCES CITED

The following references are of record in the file of this patent:

UNITED STATES PATENTS

| Number | Name | Date |
| --- | --- | --- |
| 699,405 | Newhouse | May 6, 1902 |
| 1,297,223 | Mott | Mar. 11, 1919 |
| 1,450,903 | Newhouse | Apr. 3, 1923 |
| 1,467,488 | Muste | Sept. 11, 1923 |
| 1,513,975 | Eichelberger | Nov. 4, 1924 |
| 1,566,517 | Bergman | Dec. 22, 1925 |
| 1,636,331 | Smith | July 19, 1927 |
| 2,027,697 | Nielsen | Jan. 14, 1936 |
| 2,123,537 | Marr | July 12, 1938 |
| 2,125,913 | Goebels | Aug. 9, 1938 |
| 2,240,205 | Call | Apr. 29, 1941 |
| 2,327,337 | Burch | Aug. 24, 1943 |